United States Patent [19]

Davies et al.

[11] Patent Number: 4,604,051
[45] Date of Patent: Aug. 5, 1986

[54] REGENERATIVE BURNER

[75] Inventors: Theodore E. Davies, Hudson; Dennis E. Quinn, Brunswick, both of Ohio; James E. Watson, Southgate, Mich.

[73] Assignee: Gas Research Institute, Chicago, Ill.

[21] Appl. No.: 641,331

[22] Filed: Aug. 16, 1984

[51] Int. Cl.$^4$ ............................................. F23D 11/44
[52] U.S. Cl. ..................................... 431/166; 431/170; 431/349; 126/91 A; 432/180; 432/181; 432/214
[58] Field of Search ............... 431/166, 170, 349; 126/91 A; 432/180, 181, 214

[56] References Cited

U.S. PATENT DOCUMENTS

| | | |
|---|---|---|
| 93,758 | 8/1869 | Siemens . |
| 113,584 | 4/1871 | Siemens . |
| 1,825,259 | 9/1931 | Brassert . |
| 1,848,185 | 3/1932 | Mawha . |
| 1,900,397 | 3/1933 | Isley . |
| 1,964,830 | 7/1934 | Pohl et al. . |
| 2,046,419 | 7/1936 | Tourville . |
| 2,399,609 | 4/1946 | Wainer . |
| 2,824,604 | 2/1958 | Reed ................................ 431/349 |
| 3,326,541 | 6/1967 | Davies et al. . |
| 3,870,474 | 3/1975 | Houston ........................... 432/180 |
| 4,123,220 | 10/1978 | Bond et al. . |
| 4,143,704 | 3/1979 | Kandakov et al. . |
| 4,194,874 | 3/1980 | Voorheis et al. . |
| 4,299,561 | 11/1981 | Stokes . |
| 4,355,973 | 10/1982 | Bailey . |
| 4,356,970 | 11/1982 | Vosper et al. . |
| 4,392,818 | 7/1983 | Wunning . |

FOREIGN PATENT DOCUMENTS

2128724A 5/1984 United Kingdom .

Primary Examiner—Carroll B. Dority, Jr.
Attorney, Agent, or Firm—Yount & Tarolli

[57] ABSTRACT

A burner for use in a heat regeneration system for a combustion furnace. The burner includes a burner shell having two internal chambers, wherein the first chamber is disposed on the flame axis of the burner, and the second chamber surrounds the radial perimeter of the first chamber. A gas permeable, annular regenerative bed separates the first and second chambers such that gas flow between the first and second chambers must travel through the regenerative bed in a direction which is generally radial with respect to the flame axis. The burner has "flue" and "fire" modes of operation. Valving elements are included for supplying combustion air to the second chamber under pressure when the burner is in the fire mode, and for exhausting products of combustion (POC) from the second chamber when the burner is in the flue mode. In the disclosed embodiment, the burner valving elements are annular and integral with the burner body. A fuel tube with a novel nozzle supplies fuel around the flame axis for mixing with the combustion air to support combustion when the burner is in the fire mode. An integral annular eductor is included for sucking the POC out of the second chamber when the burner is operating in the flue mode, whereby pressure within the furnace or radiant tube is maintained slightly positive or negative.

42 Claims, 13 Drawing Figures

REGENERATIVE BURNER

BACKGROUND AND FIELD OF THE INVENTION

The present invention relates to the art of combustion heating, and more particularly relates to a burner for use in a heat regenerator system.

Many large and small industrial and commercial furnaces throughout the world burn fossil fuels such as coke oven gas, natural gas, propane, butane or fuel oil. Some of the furnaces (known as "direct fired" furnaces) heat the furnace load by applying the products of combustion (POC) directly to the load. Other furnaces (known as "radiant tube" furnaces) confine the POC within ceramic or alloy tubes. The tubes transmit the heat of the POC to the furnace load, but isolate the load from direct contact with the POC.

The majority of these furnaces were designed more than one decade ago, at a time when the cost of fossil fuels was relatively low. The cost of fossil fuels has increased tremendously since then. Not surprisingly, the current high cost of fossil fuels has aroused substantial interest in methods of improving the fuel efficiency of existing fossil fuel fired furnaces. To be commercially feasible, a method of improving the efficiency of the combustion process must conform to the space and power requirements of the existing installation, and should involve the replacement of as little of the existing equipment as possible. Unfortunately, most known processes for improving the fuel efficiency of combustion furnaces involve either the replacement or substantial modification of the existing equipment. Such modifications tend to be prohibitively expensive.

It is known that the fuel efficiency of a combustion furnace can be improved by using the heat in the furnace flue gases to preheat the combustion air used in the furnace. When the heat of the flue gases is recovered in this manner, the fossil fuel need only replace the heat energy lost through the actual heating of the furnace load and through the inefficiency of recovery of the flue gas heat.

In general, flue heat recovery apparatus may be classified as either "recuperators", or "regenerators". The two terms are not used consistently in the art, and are sometimes, in fact, used interchangeably. For the purposes of the present patent application, the term "regenerator" will be understood to refer to a system wherein the direction of flow of gases through the furnace is periodically reversed, whereas the term "recuperator" will be understood to refer to those systems wherein the recovery of heat from the flue gases is accomplished without the reversing of gas flow through the furnace.

Recuperators are simply heat exchangers which transfer heat energy from the POC to combustion air by conduction through a wall or walls which separates the two fluids. Regenerators, on the other hand, include two heat storage beds. Combustion air enters the furnace through one bed while the POC leave the furnace through the other bed. A reversing valve periodically reverses the direction of flow through the furnace and the beds.

Recuperators and regenerators are well known in the art, and are represented in the prior patent literature. Heat regeneration, in particular, has been widely used in connection with steel open-hearth furnaces and glass tanks since the middle 1800's.

Attempts have also been made to apply similar techniques to smaller installations, particularly those involving radiant tubes. Patents relating to such techniques include U.S. Pat. Nos. 2,399,609 and 4,355,973, and Great Britain Patent application No. 2,128,724.

BRIEF SUMMARY OF THE INVENTION

The present invention provides a regenerative burner which may be used in either direct fired or radiant tube furnaces. The burner incorporates a regenerative bed, and is characterized by small size, and relative simplicity of operation.

The burner includes a burner shell having two internal chambers, wherein the first chamber is disposed on the flame axis of the burner, and the second chamber surrounds the radial perimeter of the first chamber. A gas permeable, annular regenerative bed separates the first and second chambers such that gas flow between the first and second chambers must travel through the regenerative bed in a direction which is generally radial with respect to the flame axis. The burner has "flue" and "fire" modes of operation. Valving means is included for supplying combustion air to the second chamber under pressure when the burner is in the fire mode, and for exhausting products of combustion (POC) from the second chamber when the burner is in the flue mode. Means is also included for supplying fuel around the flame axis for mixing with the combustion air to support combustion when the burner is in the fire mode.

In its preferred form, the burner valving means is annular and is integral with the burner body. The burner further preferably includes an integral eductor for effectively sucking the POC out of the second chamber when the burner is operating in the flue mode, whereby pressure within the furnace or radiant tube is maintained moderately low.

BRIEF DESCRIPTION OF THE DRAWINGS

The foregoing and other features and advantages of the present invention will become more readily apparent from the following detailed description, as taken in conjunction with the accompanying drawings, wherein.

DETAILED DESCRIPTION

Figure 1:
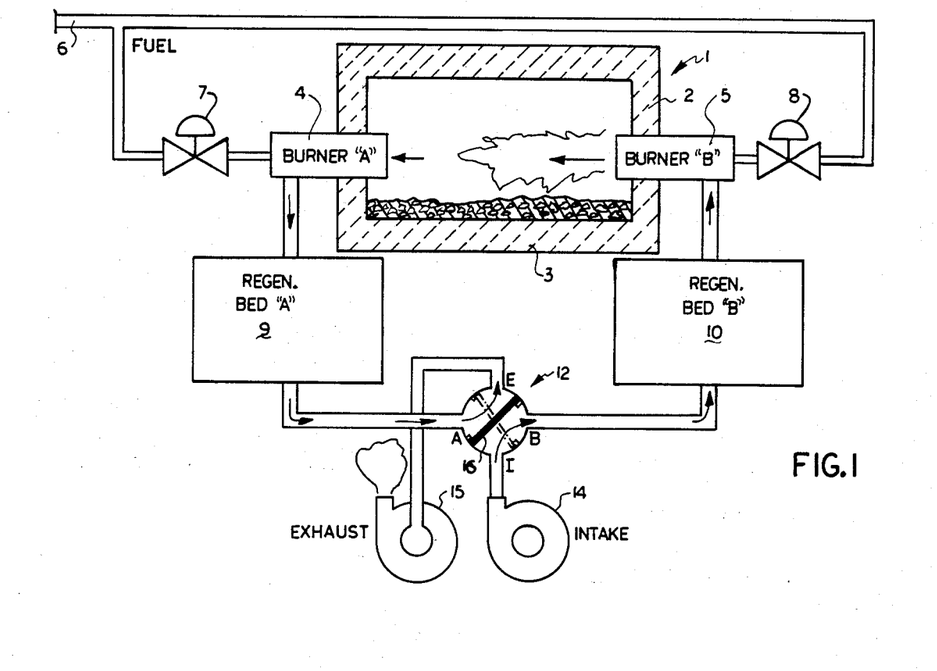
FIG. 1 is a schematic representation of a regenerative furnace incorporating prior art heat regeneration concepts.

FIG. 1 is a highly simplified schematic view of a direct fired regenerative furnace, and will be used to review typical prior art heat regeneration principles. In the Figure, the furnace 1 is shown as having thick walls 2 of refractory material, and a hearth 3 within which the material to be melted is loaded. Two similar burners 4 and 5 are mounted in the side or end walls 2 of the furnace 1. The fuel inlet of each burner is connected to a fuel line 6 via a similar automatic shut-off valve 7, 8. The air inlet of each of the two burners is connected to a similar regenerative bed 9, 10. Each regenerative bed consists of a porous checker work of refractory bricks. Such regenerative beds usually occupy more volume than the furnace, itself. The regenerative beds 9, 10 are in turn both connected to respective ports A, B of a reversing valve 12. The remaining two ports I and E (intake and exhaust) of the reversing valve 12 are respectively connected to the outlet of a blower 14 and the inlet of a fan 15.

The illustrated reversing valve includes a valving plate 16 which may be rotated into one of two positions. When in the position shown, the valve ports A and E are coupled together, as are valve ports B and I. Combustion air is thus fed to the furnace through bed 10, and products of combustion (POC) are exhausted from the furnace through bed 9. When the valve is in the position shown in phantom in FIG. 1, however, valve ports A and I are coupled together and valve ports B and E are similarly coupled. The flow of fluids through the furnace is thus reversed, with combustion air being forced through bed 9 and POC being forced through bed 10. Other types of valves and valving systems are also employed to achieve the flow patterns described above.

The fuel valves 7, 8 and reversing valve 12 are all connected to a control system (not shown) which controls the valves so as to reverse the direction of flow of POC through the furnace at periodic intervals. Each burner therefore alternately serves as an intake and an exhaust, and each regenerative bed is alternately heated by POC and cooled by combustion air.

Assume, for example, that the reversing valve 12 has been in the position shown for a period of time. The fuel valve 8 is open and the burner 5 is firing. The checker work within the regenerative bed 9 is thus becoming heated, owing to the heat given up to it by the hot POC being exhausted through it. After the regenerative bed 9 has absorbed a sizeable amount of heat, the valve 8 is closed, extinguishing the flame from the burner 5. The reversing valve 12 is then operated, causing combustion air to now be directed to the burner 4 from the blower 14 through regenerative bed 9, and furnace POC to be exhausted through the burner 5 and regenerative bed 10. After a brief delay necessary to purge the POC from bed 9, the valve 7 is opened and fuel is supplied to the burner 4. The mix of fuel and air then ignites, re-establishing combustion within the furnace. The combustion air is thus preheated by the regenerative bed 9, which was itself heated by the POC. As the bed 9 begins to cool down, the bed 10 heats up, preparing it to preheat combustion air when flow is next reversed. As the cycling continues, each bed alternately receives heat from the POC, and then returns that heat to the furnace.

The rate of furnace cycling is dependent upon the amount of time necessary for the thermal mass, in this case the checker work within the regenerative beds 9 and 10, to absorb and release heat energy. With typical installations involving very large regenerative beds composed of thick bricks of refractory material, fairly long cycle times are necessary. The cycle time may, for example, be on the order of 10 to 30 minutes.

The purpose of the exhaust fan 15 is to suck POC from the furnace, thereby keeping furnace pressure fairly close to atmospheric. Without the fan, furnace pressure would be high, causing POC to be expelled through every loose joint in the furnace. An exhaust fan such as fan 15 of FIG. 1 is not normally used on nonregenerative furnaces. Instead, furnace pressure is regulated by controlling the size of the flue opening, or, if automatic furnace pressure is desired, by throttling a damper in the flue.

The regenerator approach set forth in FIG. 1 cannot readily be applied to the many smaller furnace installations currently existing around the world. Space limitations preclude the installation of sizeable regenerative beds, an exhaust fan, or the valving and duct work necessary to change the direction of fluid flow through the furnace periodically. The present invention provides a regenerative burner incorporating an integral regenerative bed. In the preferred embodiment, much of the valving necessary to the operation of the regeneration system is also incorporated in the burner. In addition, the need for an exhaust fan is obviated by using excess capacity of the existing combustion air blower to drive an exhaust eductor. Because of the burner's novel design and resulting small size, it can readily be used as a direct replacement for an existing, nonregenerative burner.

Figure 2:
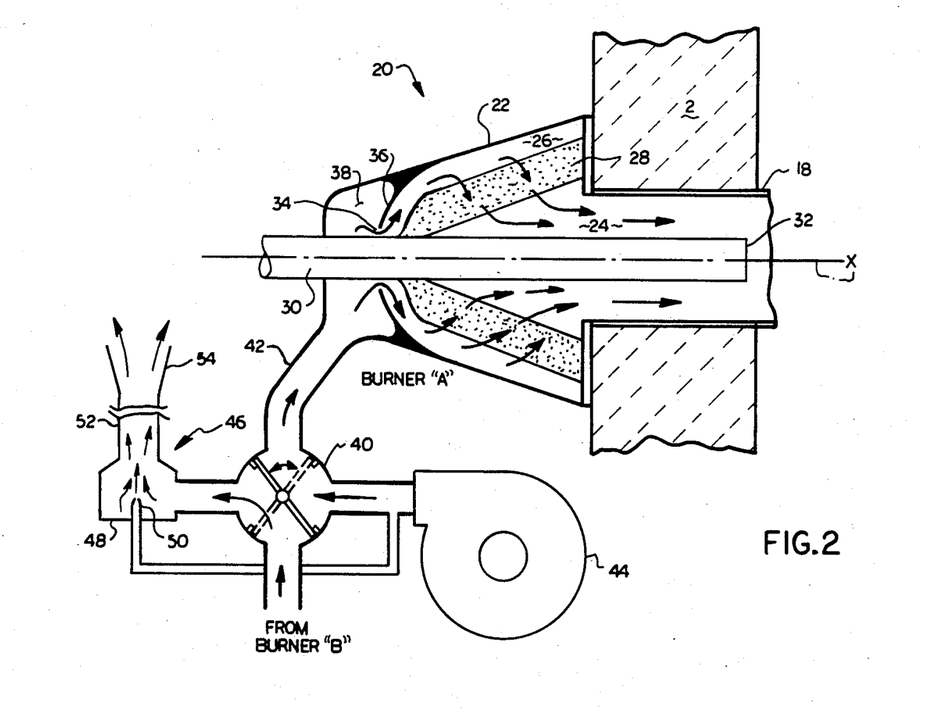
FIG. 2 is a schematic illustration of a regenerative burner in accordance with the teachings of the present invention.

FIG. 2 is a substantially simplified illustration of a regenerative burner in accordance with the teachings of the present invention. Although only one burner is shown in FIG. 2, the burners will be used in pairs, as in a typical prior art regenerative furnace installation. In FIG. 2, the regenerative burner 20 is connected to a conventional radiant tube 18. The radiant tube isolates the furnace load from the POC, while still permitting heat transfer from the POC to the load. The other burner of the pair (i.e., burner "B") is mounted in a similar fashion at the opposite end of the radiant tube. The same general burner design can also be used on a direct fired furnace, of course.

The burner 20 includes a burner shell 22. The burner shell 22 contains two chambers 24 and 26. The first chamber 24 is centered on the central axis (X) of the burner, and the second chamber 26 surrounds the radial perimeter of the first chamber 24. The two chambers 24 and 26 are separated by a regenerative bed 28, shown in FIG. 2 as having a cylindrically symmetrical, conical shape.

The burner also includes a fuel tube 30 of generally cylindrical shape, disposed along the central axis X of the burner 20. The fuel tube is connected to a fuel line (not shown in FIG. 2) which supplies fuel, either gaseous or liquid, to the burner under pressure. The front end 32 of the fuel tube 30 includes a suitable nozzle for dispersing the fuel into the surrounding combustion air, as well as a conventional ignition device such as a spark plug or glow plug. The nozzle end 32 of the fuel tube 30 is also designed to act as a flame holder, such that a stable flame can be maintained both upon start-up and during normal, high temperature operation of the burner.

Combustion air is supplied to the chamber 26 through an annulus 34, defined by the radial separation between the fuel tube 30 and an annular baffle 36 projecting radially inward from the outer shell 22 of the burner 20. The baffle 36 separates the second chamber 26 from a plenum 38, where the plenum is connected to the second chamber 26 through annulus 34, and to a reversing valve 40 through a duct 42.

The burner has two principal operational modes, referred to hereinafter as the "flue" mode and the "fire" mode. FIG. 2 is a representation of the burner when in the fire mode. In this mode, combustion air is supplied to duct 42 though reversing valve 40 under pressure by a blower 44. The combustion air thus pressurizes plenum 38, causing smooth flow of combustion air through annulus 34 into the second chamber 26. From the second chamber 26, the combustion air passes around the outer boundary of the conical regenerative bed 28, through the heat storage material (which is gas permeable) within the regenerative bed and into the first chamber 24. The combustion air then passes down the radiant tube to the nozzle end 32 of fuel tube 30, where it mixes with fuel and is combusted.

When the burner is in the flue mode, the reversing valve 40 is in the opposite position (shown in phantom in FIG. 2) and the plenum 38 and duct 42 are connected to an exhaust eductor 46. The hot POC from burner "B" travel down the radiant tube into chamber 24, across the conical inner boundary of the regenerative bed 28 into the heat storage material contained within the regenerative bed, through the outer boundary of the regenerative bed into the second chamber 26, and out to the duct 42 through the annulus 34 and plenum 38.

Thus, in the fire mode, the combustion air passes through the regenerative bed 28 before entering the combustion zone within the radiant tube, and in the flue mode the POC pass through the regenerative bed before leaving the burner. The regenerative bed will therefore absorb heat from the POC when in the flue mode, and will give up its heat to the incoming combustion air when in the fire mode. Since the hot POC must pass through the regenerative bed 28 before arriving at the second chamber 26, the temperature of the POC within the second chamber 26 will be substantially lower than the temperature of the POC within the first chamber 24. In fact, if the cycle times of the fire and flue modes are selected properly, the temperature within the second chamber 26 will remain as low as 300°–500° F. Because of this, the outer shell 22 of the burner will not require protective inner or outer thermal insulation, and can be constructed of a relatively low temperature material. The burner can thus be manufactured economically, and will occupy a much smaller, more compact area than would a similar regenerative burner requiring substantial outer insulation.

Furthermore, the novel configuration of the regenerative bed advantageously permits the use of a relatively small bed for absorbing and reradiating the heat of the POC. The ability of a regenerative bed to absorb heat is directly dependent upon the total particle surface area exposed to the heat-carrying fluid. A first volume containing small particles of heat absorbing material presents a much greater total particle surface area for heat transfer than does a second volume of the same size but containing larger particles of the same material. Thus, if a given flow rate of POC is forced through each volume (presuming the bed materials within the two volumes are initially at the same temperature), the outlet temperature of the first volume will be lower than the outlet temperature of the second volume because the heat absorbing material within the first volume will be better able to absorb the heat. Thus, a small regenerative bed formed of small bed particles will be as effective at absorbing POC heat as will a much larger bed with larger bed particles.

The size of the particles contained within the regenerative bed is limited by the maximum permissible pressure drop across the regenerative bed, however. If small particles are employed, the pressure drop across the regenerative bed will be greater than if larger particles were instead used. The configuration of the bed in the regenerative burner of the present invention allows small bed particles to be used without creating excessive bed pressure drops. The low pressure drop across the bed is principally due to the large cross sectional area of the flow path through the bed. The cross sectional surface of the flow path is conical in FIG. 2, and is characterized by a long axial dimension. The resulting flow area is large, hence the flow rate through each unit of flow area is relatively small. Pressure drop across the bed is directly related to flow rate per unit flow area through the bed, whereby a low flow rate translates directly into a low pressure drop. Also, since the bed has a large axial length, a suitable volume of bed particles can be fit into a comparatively thin bed. The resulting short fluid flow path through the bed contributes to reducing the pressure drop across the bed.

The resulting small bed does not have as great of a total heat absorption capacity as a larger bed. This limitation is readily overcome by using relatively fast cycle times, however. With cycle times of 15 seconds to one minute, for example, the bed heat absorption capacity is never reached, and bed heat absorption efficiency remains high.

The regenerative bed 28 is shown in FIG. 2 as having a cylindrically symmetrical, conical form. It will be appreciated, however, that many of the advantages of the present invention can be obtained from other shapes of regenerative beds, as well. Thus, for example, the bed may have a square, hexagonal, or octagonal axial cross section instead of the circular cross section shown in the embodiments herein. Moreover, although the conical shape is preferred, the bed may instead have a cylindrical shape or a shape which tapers in a nonlinear manner, for example. The conical shaped regenerative bed shown is presently preferred, however, because it provides a relatively direct fluid flow path, and because it shields the back end of the chamber 24 from the hot POC, thereby eliminating the need for internal high temperature insulation.

Figure 3:
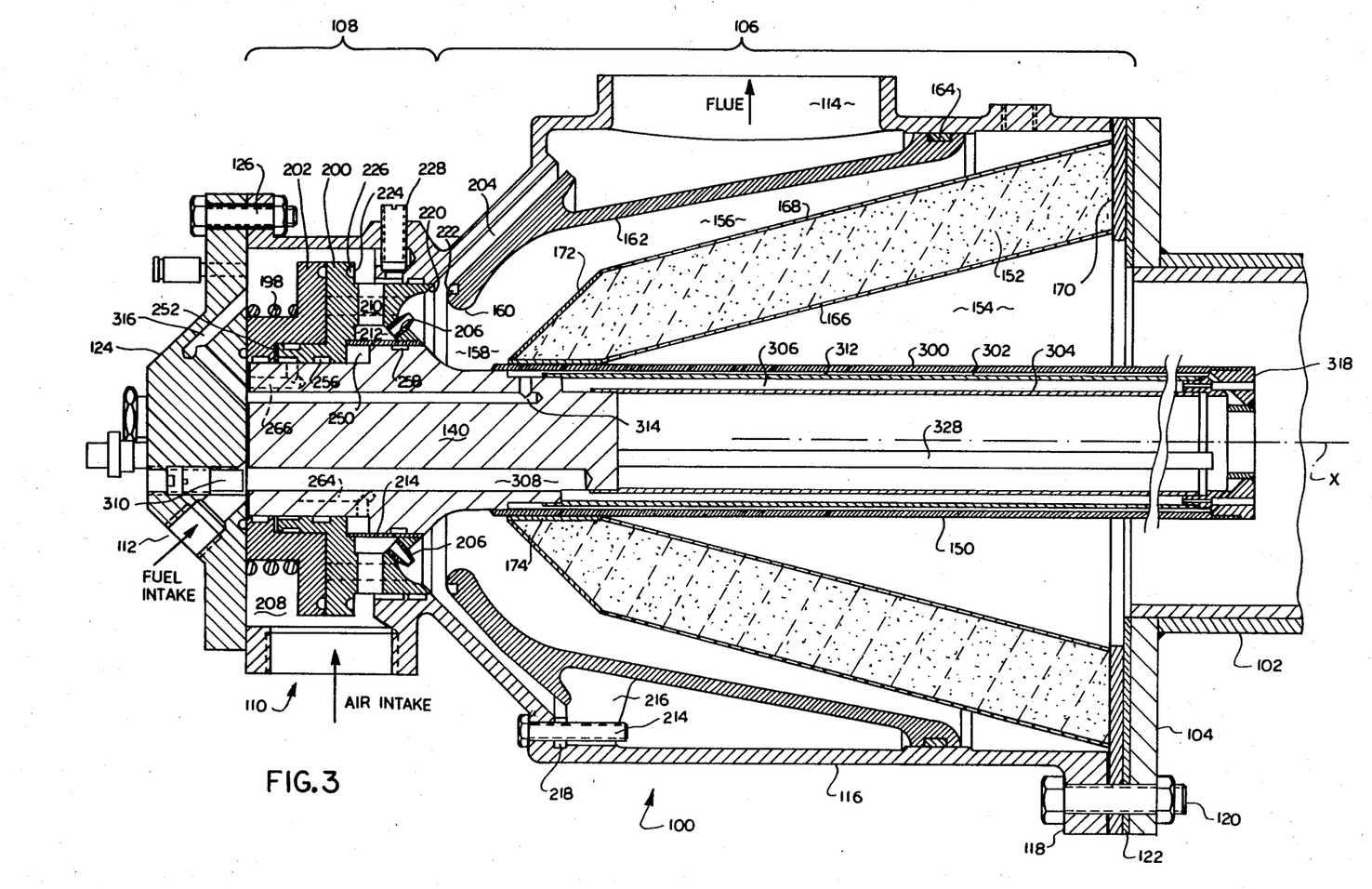
FIG. 3 is a detailed axial cross section of a preferred embodiment of a regenerative burner in accordance with the teachings of the present invention.

In the embodiments of FIGS. 2 and 3 the bed consists of a chamber packed with granular material. The bed may be formed of other materials, such as a ceramic foam, depending upon POC temperature requirements. In each case, the bed material should provide a very high heat absorption surface area per unit volume to minimize the total required bed volume. The pressure drop across the bed will remain low, however, due to the novel bed geometry which provides a short flow path and a high cross sectional flow area.

A regenerative furnace using the burner of FIG. 2 will operate much more efficiently than a conventional, nonregenerative furnace. Thus, a given amount of furnace heating may be obtained with a smaller burner and smaller combustion air flow rates than would otherwise be necessary. When the burner of FIG. 2 is used to replace an existing burner, then, not all of the capacity of the existing blower will be used to supply combustion air. In FIG. 2, the excess capacity of the blower is used to operate an exhaust eductor 46, thereby eliminating the need for an exhaust blower, per se. The eductor 46 is of conventional construction, and includes a plenum 48, eductor jet 50, and an outlet including a throat 52 and diffuser 54. The jet 50 is supplied with pressurized air by the blower 44, and creates a high velocity air stream through the throat 52 and diffuser 54. As the stream of air moves through the outlet, POC from the plenum 48 become entrained in it. A partial vacuum is thus formed in the plenum 48, causing POC to be sucked into it from the furnace through the reversing valve 40.

Figure 4:
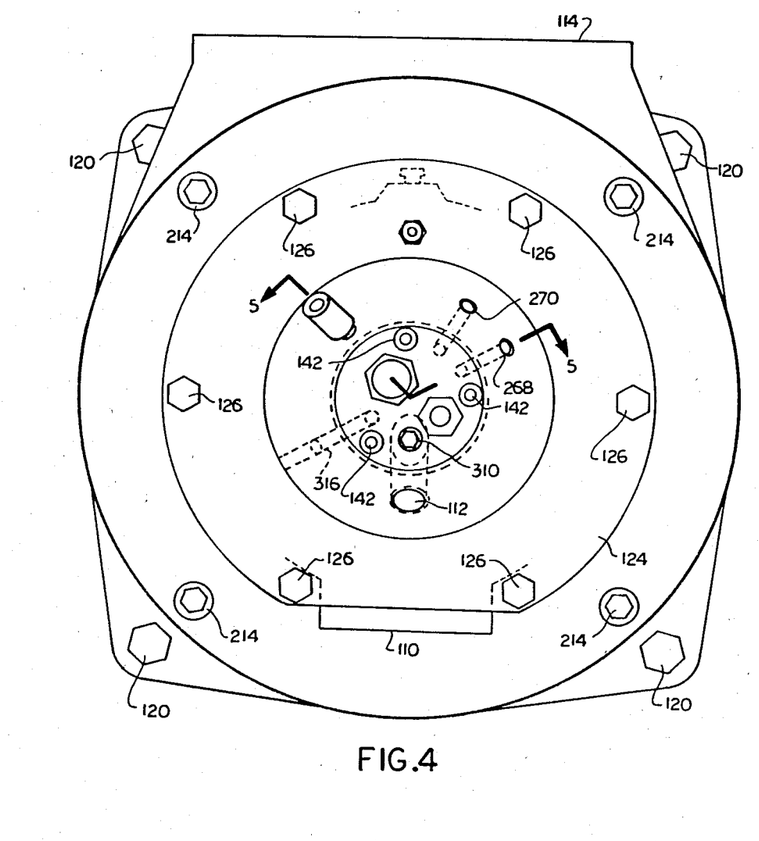
FIG. 4 is an end view of the regenerative burner of FIG. 3.
Figure 5:
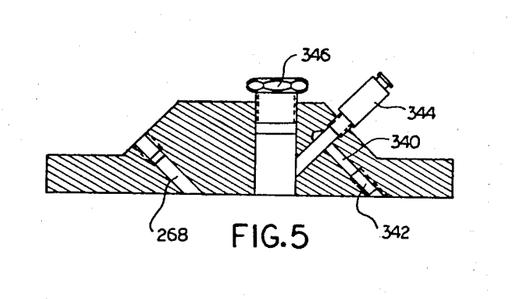
FIG. 5 is an axial cross section of the back plate of the regenerative burner of FIG. 3.

FIG. 3 is an axial section of a preferred embodiment of a regenerative burner in accordance with the teachings of the present invention. FIGS. 4 and 5 are respectively an end view of the burner and an axial section of the end cap of the burner. The burner shown in FIGS. 3, 4 and 5 incorporates the regenerative bed design shown in simplified fashion in FIG. 2, and also incorporates integral combustion air and POC valving, and an integral exhaust eductor, thereby reducing the need for components external to the burner. In FIG. 3, the burner 100 is shown connected to a radiant tube 102. The burner 100 includes a regenerator section 106 which is similar in principal of operation to the regenerative burner shown in FIG. 2, and a valve and eductor section 108. Air intake to the burner is provided through an intake port 110, and the intake of fuel to the burner is provided through a fuel intake port 112. The burner has been designed for operation with a gaseous fuel such as natural gas, coke oven gas, or propane, however obviously it could be modified to instead use a liquid fuel such as fuel oil. A flue 114 exhausts the POC from the burner when the burner is operating in the flue mode.

The regenerative burner 100 of FIGS. 3, 4 and 5 has an outer shell 116 which is generally cylindrical in the area adjacent the radiant tube 102. The shell 116 tapers to a smaller cross section in the area between the two sections 106 and 108. The shell 116 includes a mounting flange 118 which is fastened to the mounting flange 104 of the radiant tube via bolts 120. In the embodiment shown in the Figures, four bolts (best seen in FIG. 4) connect the burner flange to the flange 104 of the radiant tube. The bolt 120 shown in FIG. 3 has been rotated out of position so that it appears on the drawing. A ring gasket 122 seals the joint between the burner body 100 and the mounting flange 104 of the radiant tube 102. When mounted to the radiant tube, the axis X of cylindrical symmetry of the burner 100 (which coincides with the flame axis of the burner) is coincident with the central axis of the radiant tube.

A generally disc-shaped back plate 124 closes off the rear axial end of the burner shell 116, and is secured to the shell 116 by four bolts 126, again best seen in Fig. 4. One of the bolts 126 is shown rotated out of position in FIG. 3 so that it appears on the drawing. A fuel tube stem 140 is secured to the inside surface of the back plate 124 by machine screws 142 (see FIG. 4) and a fuel tube 150 is suspended concentric with the axis X on the stem 140.

As stated above, the regenerator section 106 of the burner 100 is generally similar in operation to the burner shown in FIG. 2. The regenerator section 106 includes the cylindrical fuel tube 150 disposed along the flame axis X of the burner, and a conical regenerator bed 152 disposed coaxially around it. The regenerator bed 152 separates the interior of the regenerator section 106 into a first chamber 154 and a second chamber 156. The first chamber 154 is in direct fluid flow communication with the radiant tube 102, being disposed essentially adjacent the flame axis X of the burner. The second chamber 156 is disposed on the radially opposite side of the regenerator bed 152, and thus communicates with the chamber 154 only through the regenerator bed 152. Combustion air is supplied to chamber 156 through an annulus 158 defined between the fuel tube stem 140 and the interior end 160 of a baffle 162.

The baffle 162 is generally conical, and has an inner radius which is greater than the outer radius of the regenerative bed 152. The second chamber 156 is largely bounded by the baffle 162 on the one hand and the regenerative bed 152 on the other hand. The front end of the baffle 162 radially abuts the interior surface of the burner shell 116. A seal 164 is provided between the shell 116 and baffle 162 to prevent gas leakage into the flue 114.

The thermal mass contained within the regenerative bed 152 is confined within a conical cavity defined between perforated inner and outer bed walls 166 and 168, and front and back plates 170 and 172. The inner and outer walls 166 and 168 have similar conical slopes, whereby the radial separation between the two walls remains substantially constant over their axial lengths. The washer-shaped front plate 170 bridges, and thus seals, the radial gap between the front edges of the inner and outer walls 166 and 168. The radially outer edge of the front plate 170 is sandwiched between the flange 118 of the burner 100 and the flange 104 of the radiant tube 102, thereby holding the regenerative bed 152 in a fixed position relative to the radiant tube and the burner. The back plate 172 of the bed is conically shaped, but has a greater inclination than the inner and outer regenerative bed walls 166 and 168. A cylindrical sleeve 174 spans the gap between the inner boundary of the back plate 172 and the inner boundary of the inner bed wall 166. The sleeve 174 is coaxial with the fuel tube 150, which fits snugly through the sleeve.

Preferably, the inside bed wall 166 is formed of a high temperature metal or ceramic material. The outer bed wall 168, however, can be formed of a material having a lesser temperature resistance. Both walls are perforated with many small, closely spaced holes so that air can freely enter and leave the bed from the first and second chambers 154 and 156. The interior conical cavity of the regenerative bed 152 is packed with particles of a thermal storage material. The thermal storage material may, for example, consist of No. 10 silicon carbide abrasive grit having an average diameter of 0.083 inches. Other materials could, of course, also be used. The thermal storage material contained within the regenerative bed 152 is poured into the bed cavity through a filler hole piercing the front plate 170. The filler hole is not shown in FIG. 3.

The valve section 108 of the regenerative burner 100 is operative to connect the annulus 158 to the air intake port 110 when the burner is operating in the fire mode, and to the flue 114 when the burner is operating in the flue mode. The valve section 108 essentially includes only two moving parts, an annular front piston 200 and an annular rear piston 202. The two pistons 200 and 202 can each slide axially toward or away from the annulus 158 along cylindrical outer surfaces on the fuel tube stem 140. The pistons are biased in a frontward position by a coaxial spring 198 which acts between the back plate 124 of the burner and a radially extending surface of the back piston 202. The positions of the two pistons 200 and 202 are controlled pneumatically in a manner which will be described hereinafter.

The general purpose of the front piston 200 is to switch the burner between flue and fire modes. The general purpose of the rear piston 202, on the other hand, is to close off axial passages in the front piston 200 when the burner is switched to a low fire position. This effectively blocks off the flow of combustion air and/or POC through the regenerative bed 152.

The regenerative burner 100 is shown in the flue mode in FIG. 3. In this mode (see FIG. 6A and 6B), both of the pistons 200 and 202 are in their rearmost position, wherein the back piston 202 directly abuts the back plate 124, and the front piston 200 directly abuts the back piston 202. An annular conical channel 204 between the annulus 158 and the flue 114 is therefore open. Thus, POC from the matching burner on the opposite end of the radiant tube 102 pass through first chamber 154, regenerative bed 152, second chamber 156, annulus 158, channel 204, and thus pass into the flue 114.

In order to maintain the pressure within the radiant tube 102 at or near atmospheric, an eductor is built into the valve section 108 of the regenerative burner 100. The eductor includes a plurality of individual air jets 206 spaced around the perimeter of the front piston 200. The jets direct a smooth and continuous flow of combustion air from the air intake port 110 through the annular channel, 204, thereby creating a partial vacuum drawing the POC into the flue 114. Air reaches the jets 206 through an annular plenum 208 surrounding the pistons. The air intake port 110 opens into the plenum 208. The front piston 200 includes a plurality of radial passages 210, equally spaced around its circumference. The outer ends of the passages all open into the plenum 208 when the front piston is in the flue position, as shown. The inner ends of the passages 210 all open into an annular chamber 212 within the front piston. The jets 206 are set into chamber 212. The inner boundary of the annular chamber 212 is sealed by a cylindrical sleeve 214. The sleeve 214 is welded or otherwise fastened to the interior circumference of the front piston.

The shape of the channel 204 is determined by the shape of the two conical walls which together define the boundaries of the channel. The two conical walls are annular, extend in generally radial directions, and are generally parallel to one another at all points around the circumference of the channel. The outer wall (represented by the inner surface of the shell 116) has a radius which increases as a linear function of axial position (i.e., the outer wall has a constant slope). The inner wall of the channel 204, however, has a more complex shape selected to optimize the operation of the eductor. The inner wall of the channel 204 is represented by the outer surface of the baffle 162. The outer surface of the baffle 162 has a shape selected such that the cross sectional area of the channel 204 remains constant over approximately the first half of its length, adjacent the annulus 158, but increases gradually in the second half nearer the flue 114. The first half represents the throat of the eductor and the second half, the diffuser. The throat and diffuser sections form an exhaust chimney having an inner annular port coupled to the annulas 158 and an outer annular port coupled to the flue 114.

The axial separation between the two walls of the eductor channel 204 is determined by the axial position of the baffle 162 within the burner shell 116. The baffle 162 is fastened within the shell 116 by four bolts extending axially through the shell 116 and through four spiders 216 extending radially outward from the baffle 162. The axial spacing between the spider 216 and the shell 116, and thus the axial spacing between the two walls of the eductor channel 204, is determined by spacers 218 through which the machine bolts 214 extend.

It will be noted that the size of the eductor can be readily altered. The only changes necessary to increase or decrease the size of the eductor are to (1) change the size of the jets 206, (2) machine the outer surface of the baffle 162 differently, and (3) change the spacers 218. No major elements of the system need be replaced. Consequently, the same general burner elements can still be used in burners having different flow ratings.

The eductor has a relatively short throat and diffuser length, much shorter than would a conventional eductor having the same flow capacity. In general, an eductor length should be around eight times the throat diameter. Moreover, in conventional eductors the throat is a simple open circular cavity, hence the throat diameter establishes the flow capacity of the eductor. If a high flow is required, then a large throat diameter is used. In the FIG. 3 eductor, however, the eductor throat is an annular channel rather than a simple open circular cavity. The cross sectional flow area of the annular eductor channel is functionally related to the diameter of the annulus and is quite high, even though the spacing between the inner and outer throat walls is small. The height of the eductor, however, need only be eight times the spacing between the throat walls. Thus, the eductor has a high flow capacity, but still only a short eductor length. Incorporation of the eductor into the burner design has thus not significantly affected the overall size of the burner.

Figure 7A:
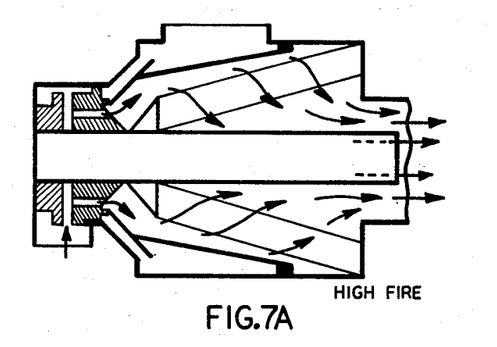
FIG. 7A is a simplified axial section of the regenerative burner of FIG. 3, illustrating the path of fluid flow through the burner when the burner is operating in the high fire mode.
Figure 7B:
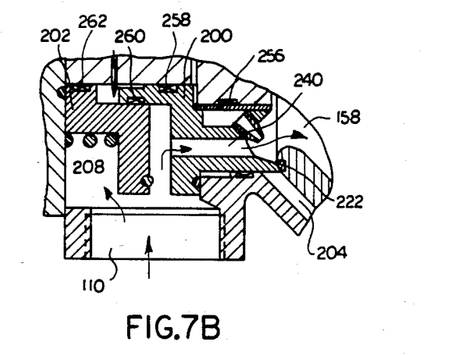
FIG. 7B is a detail view of a portion of the valve and eductor section 108 of the burner of FIG. 3 when the burner is operating in the high fire mode.

In order to switch the burner from a flue to a fire mode, the direction of fluid flow through the burner is changed. The front piston 200 is forced to a forward position, wherein an annular lip 220 at the forward edge of the front piston abuts a matching annular bumper 222 carried by the baffle 162 (see FIGS. 7A and 7B). The front piston 200 then seals off the eductor channel 204, preventing further exhaust through the flue 114.

The piston 200 has a radially projecting ridge 224 machined into it behind the radial passages 210. The axial spacing between the ridge 224 and the lip 220 is selected such that the ridge abuts the front wall of the plenum 208 at the same time that the lip 220 of the piston seats against the bumper 222. The ridge 224 carries an O-ring 226 (best seen in FIG. 6B) to provide an air-tight seal between the piston ridge and the plenum wall, thereby preventing fluid flow into the radially extending channels 210 when the front piston is seated in its frontward position. Consequently, very little combustion air is communicated through the jets 206 when the front piston 200 is in its forward position. Some residual jet air flow is supplied through a manual bypass valve 228, however, for "low fire" mode purposes to be described hereinafter.

If the rear piston 202 is held in its rearward position when the front piston 200 is seated forward, the burner air valving is in its high fire mode. Then, the facing radially extending surfaces of the front and rear pistons become separated, allowing combustion air flow through a series of axial passages 240 extending through the front piston 200. The axial passages 240 are spaced circumferentially around the piston 200 at angular positions alternating with the radial passages 210. The axial passages provide a direct air flow path between the air intake plenum 208 and the annulus 158, thereby permitting a controlled flow of combustion air to be forced into the burner 100. The volume of combustion air flowing into the burner is directly dependent upon, the air pressure at the intake port 110 and the size of the axial passages 240.

Figure 8A:
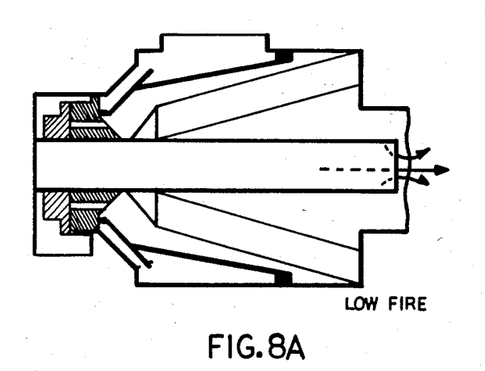
FIG. 8A is a simplified axial section of the regenerative burner of FIG. 3, illustrating the path of fluid flow through the burner when the burner is operating in the low fire mode.
Figure 8B:
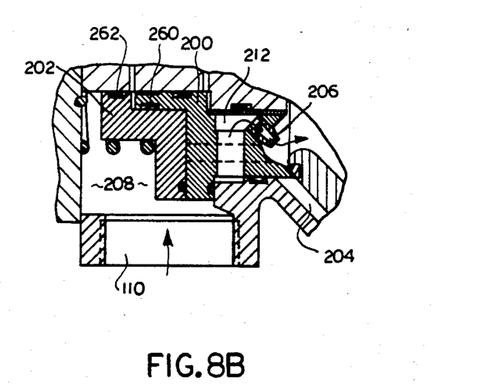
FIG. 8B is a detail view of a portion of the valve and eductor section 108 of the burner of FIG. 3 when the burner is operating in the low fire mode.

The flow of combustion air into the burner is blocked when the rear piston 202 moves forward, into a position wherein its radial extending forward surface seats against the radial extending rear surface of the front piston 200 (see FIGS. 8A and 8B). When fully seated in its forward position the air valving is in its low fire mode. The rear piston 202 then completely blocks the flow of air through the passages 240, thereby effectively halting the flow of combustion air into the burner. When the pistons are thus both in their forward position, the only flow of combustion air into the burner is the air which flows from the plenum 208 through the bypass valve 228, through the radial chambers 210 into the plenum 212, and into the annulus 158 through the jets 206. The magnitude of this air flow can be adjusted by manually adjusting the position of the bypass valve 228.

The positions of the two pistons 200 and 202 are controlled by controlling the air pressure within two annular pressure chambers 250 and 252. The first pressure chamber 250 is bounded on its inner and outer radial sides by the fuel tube stem 140 and piston 200, respectively, and at its front and rear by a radially extending step in the stem 140 and a matching radially extending surface of the piston 200, respectively. Sliding seals 256 and 258 seal pressure within the chamber 250. The second pressure chamber 252, on the other hand, is bounded on its inner and outer sides by the fuel tube stem 140 and piston 200, respectively, and on its forward and rear by the first piston 200 and second piston 202, respectively. Sliding seals 256, 260, and 262 seal the junctions between the front and rear pistons and the stem 140, thereby sealing the pressure chamber 252.

The pressure within the two chambers 250 and 252 is controlled by controlling the pressure within control passages 264 and 266 bored in the fuel tube stem 140. The control passages 264 and 266, shown in phantom in FIG. 3, are aligned with corresponding taps 268 and 270 in the burner back plate 124 (see FIGS. 4 and 5). Thus, the pressure within the two chambers 250 and 252 can be controlled by suitable pressure lines connected to the taps 268 and 270 at the back of the burner. (The control passages 264 and 266 have been rotated out of position in FIG. 3 for convenience of illustration.)

Figure 6A:
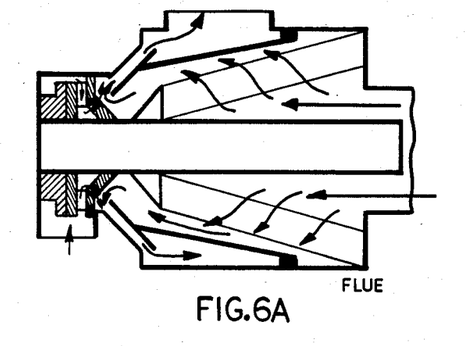
FIG. 6A is a simplified axial section of the regenerative burner of FIG. 3, illustrating the path of fluid flow through the burner when the burner is operating in the flue mode.
Figure 6B:
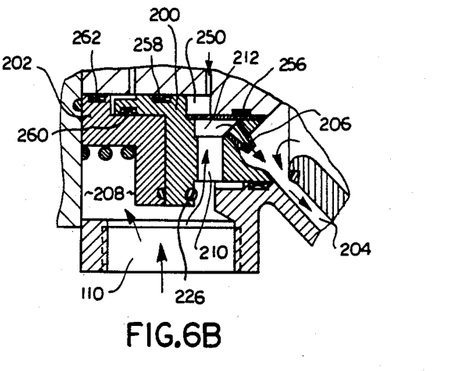
FIG. 6B is a detail view of a portion of the valve and eductor section 108 of the burner of FIG. 3 when the burner is operating in the flue mode.

The valve pistons 200 and 202 can be placed in the low fire position by venting both of the chambers 250 and 252 to atmosphere. The spring 198 then forces the pistons 200 and 202 to seat in their fully forward positions, blocking most air flow into the annulus 158. The valving pistons can be placed in a flue position, on the other hand, by applying a 60 psi pressure signal to the pressure chamber 250, while venting the second pressure chamber 252 to atmosphere. The air pressure in chamber 250 then overcomes the bias introduced by the spring 198, forcing the two pistons 200 and 202 into their rearmost position, as shown in FIGS. 3 and 6A and 6B. The eductor is then active, and the valving mechanism is in the flue position. The valve pistons can be placed in the high fire position by applying a 60 psi air pressure signal to chamber 252, while venting pressure chamber 250 to atmosphere. The pressure in the chamber 252 causes the two pistons 200 and 202 to separate. The rear piston 202 retreats rearward against the bias of spring 198, while the front piston is driven forward against the bumper 222. Combustion air then floods into the chamber 156 through annulus 158.

The fuel tube 150 includes three concentric cylinders 300, 302, and 304. The three concentric cylinders are of slightly different diameter, and each slips over a correspondingly diametered section of the stem 140. Two cylindrical chambers are formed between the three gas tubes. The inner chamber 306 is supplied with combustion fuel, such as natural gas, through a tap 308 in the stem 140. The tap 308 is aligned with the fuel intake port 112 formed in the burner back plate 124. The size of the orifice between the fuel intake port 112 and the tap 308 can be adjusted by a gas valve 310. The gas valve 310 is essentially just a cylindrical plug having an outer diameter approximating the outer diameter of the tap 308. The plug can be screwed into or out of a tapped hole within the back plate 124, thereby adjusting the spacing between its end face and the tap 308.

The outer cylindrical chamber 312 between the outer two cylinders 300 and 302 is supplied with combustion air in order to cool the fuel tube and prevent cracking of the fuel within the inner chamber 306. The outer chamber 312 is supplied with combustion air through another tap 314 in the stem 140. The tap 314 is coupled to the combustion air plenum 208 through air passages 310 formed in the burner back plate 124. Since the outer chamber 312 is directly connected to the air intake 110, there is a continuous flow of combustion air between the two outer cylinders 300 and 302 of the fuel tube, regardless of the mode in which the burner is operating at a given time.

Both the combustion air in the chamber 312 and the gas in chamber 306 travel axially down the fuel tube to the nozzle 318 located at the front of the fuel tube. The nozzle 318 is generally ring-shaped, having an open center, and a stepped outer diameter at its rear end. The diameters of the steps are selected such that each of the cylinders snugly fits over a corresponding one of the steps.

Figure 9:
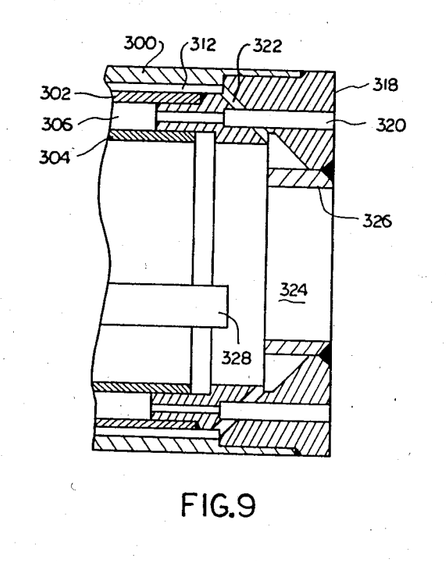
FIG. 9 is an expanded axial section of the fuel nozzle of the burner of FIG. 3.

The nozzle can best be seen in FIG. 9. The nozzle 318 includes a series of axial passages 320 which are radially aligned with the gas chamber 306 between the two inner cylinders 302 and 304. The axial passages 320 are drilled in the nozzle 318 at equally spaced circumferential positions around the end face of the nozzle. The passages 320 include a small diameter segment adjacent the gas chamber 306, and a larger diameter segment adjacent the front end face of the nozzle 318. The step transition in the diameter of the passages 320 produces the required gas exit velocity. A second series of holes 322 extend diagonally through the nozzle 318 at the same circumferential location as the holes 320. The holes 322 intersect the holes 320, and open into the air chamber 312 between the two outer cylinders 300 and 302.

Since the two passages 320 and 322 intersect one another, the flow of combustion air through the passages 322 interacts with the flow of the gas fuel through passages 320. The nature of the interaction changes in accordance with the pressure of the gas within the chamber 306. The pressure of the combustion air within the chamber 312 remains constant, and is rather low.

When the burner is in the high fire mode, high pressure gas is applied to the gas inlet port 112, and thus to the chamber 306. The flow of gas through the orifices 320 into the radiant tube is then essentially unimpeded by the flow of combustion air through the passages 322. The gas therefore streams through the passages 322 at high velocity, mixing with the combustion air in the surrounding combustion chamber at some point downstream of the nozzle 318. A large flame is therefore provided within the radiant tube, separated from the nozzle 318 by at least several inches.

When the burner is in the low fire mode, low pressure gas is instead applied to the gas inlet port 112, and thus to the gas chamber 306. The flow of gas through the passages 320 is then deflected by, and becomes entrained in, the flow of combustion air through the passages 322. A combustible mixture thus forms within the central chamber 324 of the fuel tube. Efficient mixing of the combustion air and the entrained gas is assured by a cylindrical turbulence ring 326 welded to the interior perimeter of the nozzle 318, within the path of the gas-/air mixture flowing out of the passages 322. The combustible mixture is ignited within the central chamber 324 by a glow plug 328. The glow plug 328 extends axially through the fuel tube stem 140 and the fuel tube 150, terminating immediately adjacent the turbulence ring 326 at the interior chamber of the nozzle 318.

The nozzle 318 functions as a flame holder when low pressure gas is applied to the gas chamber 306, and maintains a stable, continuous flame within the central chamber 324 even when the temperature within the radiant tube is very low. Thus, burner ignition and furnace start-up can be conveniently and efficiently accomplished.

The area within the central cylinder 304 is open so as to enable observation of the flame from outside of the burner. The burner back plate 124 is tapped with an observation port which aligns with a similarly dimensioned observation bore in the fuel tube stem 140. The observation bore in the stem 140 is not shown in the drawings. The observation port is purged with combustion air supplied through a passage 340 (FIG. 5) in the back plate 124. A suitable orifice 342 is mounted within the passage 340 to regulate the flow of purge air into the observation port. Purge air supplied through the chamber 340 cleanses the central chamber within the cylinder 304, keeping it clear for observation purposes. A fitting 344 mounted to the burner back plate 124 provides access to the combustion chamber through the observation port, permitting measurement of radiant tube pressure. In FIG. 5, the observation port is closed by a plug 346 containing a glass observation window (not shown).

Figure 10:
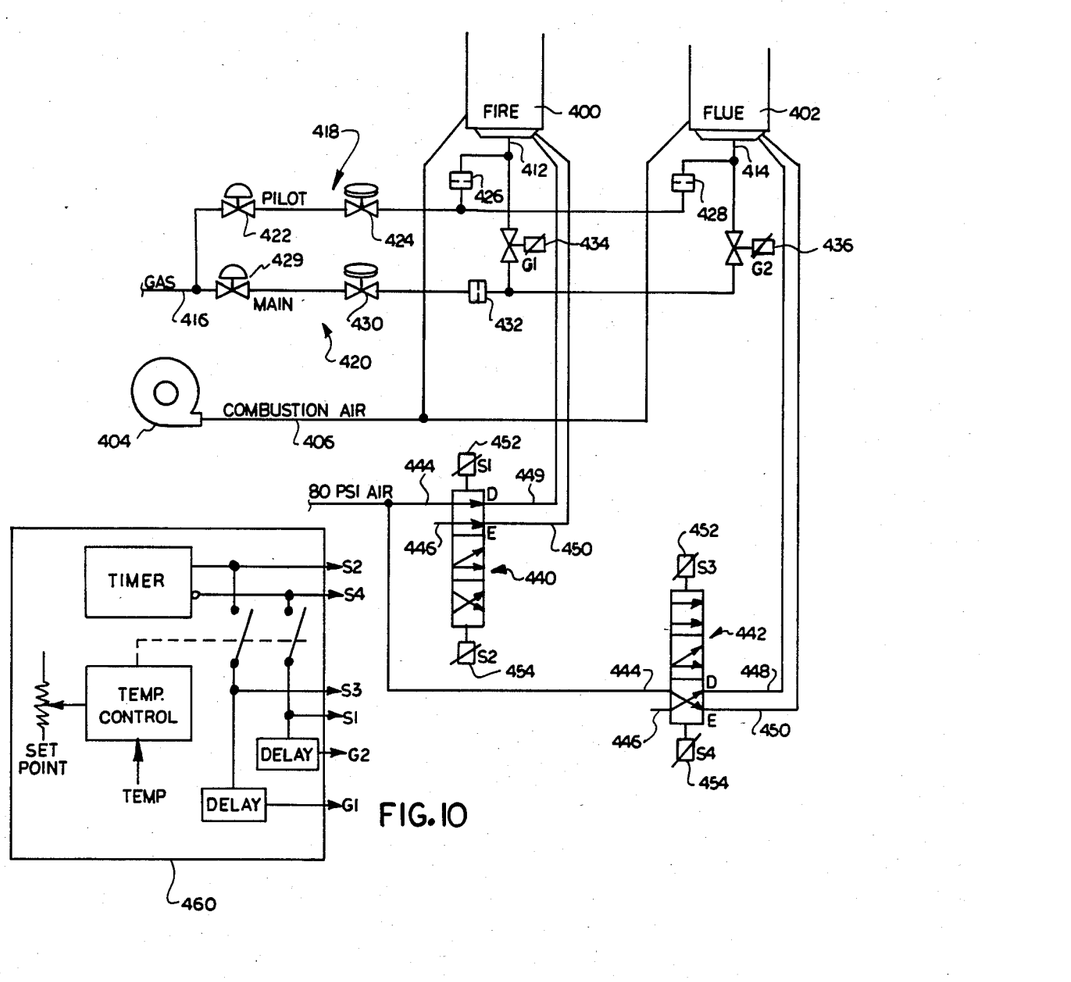
FIG. 10 is a schematic of the gas and combustion air supply lines feeding a pair of regenerative burners, and associated control elements.

FIG. 10 is a schematic of the gas and air supply piping associated with a pair of burners 400 and 402 on opposite sides of a radiant heating tube. The burners 400 and 402 are preferably constructed as shown in FIGS. 3–9. A blower 404 supplies combustion air under pressure to the burners. The combustion air pipe 406 is connected to the air intake ports of the two burners 400 and 402. The gas intake ports 412 and 414 of the two burners 400 and 402, respectively, are each connected to a gas supply line 416 through two parallel gas supply paths 418 and 420. The pilot gas supply path 418 includes a manual shut-off valve 422 and a pilot gas pressure regulator 424. The amount of pilot gas flowing into each gas inlet port 412 and 414 is regulated by orifice plates 426 and 428, each connected between the outlet of pressure regulator 424 and the gas intake port 412 and 414 of a respective burner.

The main gas supply path includes a manual shut-off valve 429, a pressure regulator 430 and a main gas orifice plate 432. The outlet of the orifice plate 432 is connected to the gas inlet port of each of the burners through a respective solenoid valve 434, 436. A single gas orifice plate is provided for both burners because only one of the solenoid valves 434, 436 will be energized at a given time, hence the entire gas flow through the orifice plate 432 will be supplied to a single one of the two burners. Two pilot gas orifice plates are provided, on the other hand, since pilot gas will flow to both burners at the same time. The pressure at the outlet of regulator 430 is about the same as the pressure at the outlet of regulator 424. The difference between pilot and main gas flow rates is therefore essentially a function only of the size of the orifice plates 426, 428 and 430.

As stated previously, each burner is controlled as to its mode of operation by pneumatic signals applied to chambers 250 and 252 (see FIGS. 3 and 6A–8B). The pneumatic control signals for burners 400 and 402 are supplied by two identical solenoid operated spool valves 440 and 442, respectively. Each spool valve has two input lines 444 and 446 and two output lines 448 and 450. The input line 444 of each spool valve is connected to a source of high pressure air (e.g., 60 psi), whereas the second input line is left open. The two output lines 448 and 450 of each spool valve are respectively connected to the two control ports 468 and 470 of the corresponding burner.

Each spool valve 440 and 442 has three positions, and is controlled by electrical signals supplied to the solenoids 452 and 454 on opposite sides of the spool valve. When the solenoid 452 of a spool valve is actuated, high pressure air is applied to control line 448, and control line 450 is vented to the surrounding air. The front and back pistons of the burner are then in the high fire position shown in FIG. 7B, and a high flow of combustion air is admitted to the burner. When the other solenoid 454 is actuated, on the other hand, the output line 448 is vented to outside air and the output line 450 is connected to the pressurized input line 444. This causes the two pistons of the associated burner to assume the flue positions shown in FIG. 6B, activating the exhaust eductor for that burner. When neither of the two solenoids is operated, the spool valve assumes its middle position, and both control lines are vented to the outside air. The pistons are then in the low fire position shown in FIG. 8B, and the majority of the flow of combustion air into the chambers 156 and 154 is effectively blocked.

When the system is first brought into operation, the valve 422 is opened so as to supply pilot gas to both burners 400 and 402. The main gas shut-off valve 429 is closed at this time. The two solenoids associated with each of spool valves 440 and 442 are controlled by an electronic control circuit 460 which causes the spool valves to cyclically (e.g., every 15 seconds or so) switch the burners between flue and high fire positions. Opposite solenoids on the two spool valves are operated so that the two burners are in complementary modes, however. Thus, solenoids 452 of valve 440 and 454 of valve 442 are actuated at the same time, and thereafter solenoids 454 of valve 440 and 452 of valve 442 are actuated at the same time. Thus, when burner 400 is in the high fire mode, burner 402 is in the flue mode, and vice versa. The glow plugs associated with the burners 400 and 402 are also energized, thereby igniting the burnable mixture within the fuel tubes of the two burners 400 and 402. The main gas solenoid valves 434 and 436 cycle along with the spool valves. No gas is supplied to the burners through these valves, however, since shut-off valve 429 is still closed.

Once stable pilot flames have been established in the two burners, the main gas shut-off valve 429 is opened. Thereafter, main gas is supplied to each burner whenever its associated solenoid valve is actuated. When spool valve 440 is placed in the high fire position, for example, the corresponding gas solenoid valve 434 is also actuated. Actuation of the solenoid valve 434 is preferably (though not necessarily) delayed by approximately 10 milliseconds in order to permit the fresh combustion air to purge the bed within the burner 400 of flue gases. The gas solenoid valve is turned off without delay when the spool valve for the same burner is switched to a flue mode, however, thereby immediately extinguishing the high fire flame. A small pilot flame continues to burn within the central chamber in the fuel tube, however, since pilot gas is continually supplied to the two burners in the particular embodiment illustrated in FIG. 10. (Alternatively, of course, the pilot gas for a burner could be automatically turned off whenever the burner is in the flue mode.)

When the temperature within the furnace rises above the furnace set point temperature, the control circuit 460 disables the solenoids 452 associated with both spool valves, thereby causing each spool valve to then cycle between a flue state (solenoid 454 "on") and a low fire state (both solenoids "off"). The control circuit 460 simultaneously disables both gas solenoid valves 434 and 436, hence only pilot gas is supplied to the burners thereafter. Each burner 400 and 402 therefore cycles between the low fire and flue modes, but continually maintains a small pilot flame. When the furnace temperature drops a cetain amount below the set point, the main gas solenoid valves 434 and 436 are again re-enabled, as are the solenoids 452 associated with the spool valves 440 and 442. Consequently, in succeeding cycles, the burners will once again cycle between flue and high fire modes.

The control system illustrated in FIG. 10 is only one example of a control system which could be used to control and cycle two of the burners in accordance with the teachings of the present invention. Obviously, many different control systems could instead be provided. It may, for example, be desirable to integrate virtually all of the valving functions illustrated in FIG. 10 into the respective burners, thereby eliminating the need for even more plumbing external to the burners. Each burner would then include an integral spool valve, pilot gas valve, and main gas valve. Thus, it would be necessary to provide only three pipe connections to the burner (gas, combustion air, compressed air) together with an electrical cable providing the necessary solenoid control signals.

The following is a summary of the dimensions and calculated performance parameters of a regenerative bed designed for use in a 424,000 BTU burner. The burner provides the same heat output as, and thus can be used as a replacement for, a nonregenerative 707,000 BTU burner.

| DATA SUMMARY FOR CONICAL REGENERATIVE BED |
| --- |
| All dimensions in inches. |
| All temperatures in degrees F. |
| INPUT |
| bed    Material: #10 silicon carbide grit |
|        length: 10.625 |
|        small i.d.: 3.125 |
|        depth: 1.6875 |
| air    inlet temp.: 100 |
|        flow (lb/hr): 340.6 |
| POC    inlet temp.: 2000 |
|        flow (lb/hr): 373.0 |
|        cycle time (sec): 15 |
| OUTPUT |
| bed    volume (cu in): 405 |
|        surface (sq ft): 104 |
|        weight (lb): 25.6 |
| air    average outlet temp.: 1920 |
|        maximum pressure drop (in wc): 1.48 |
|        mass velocity inner cone (lb/hr/sq in): 1.81 |
| POC    average outlet temp.: 400 |
|        maximum pressure drop (in wc): 1.90 |
|        mass velocity inner cone (lb/hr/sq in): 1.98 |
|        effectiveness (BTU trans. to air/BTU avail. in POC): 87% |

Note that the bed is quite thin, having a depth of less than two inches. The cross sectional flow area of the bed, on the other hand, is relatively large (greater than the surface area of a cylinder three inches in diameter and ten inches long). The depth is actually much smaller than the square root of the cross sectional flow area in the above example.

Note that the pressure drop across the bed in the flue mode is only 1.9 in. wc. The described eductor has the capability of providing, and is designed to provide, a 1.9 in. wc vacuum, resulting in a radiant tube pressure close to atmospheric. Note also that the calculated bed air outlet temperature is 1920° F., less than one hundred degrees short of the 2000° POC inlet temperature. The very high bed effectiveness (87%) significantly lowers burner heating demands, reducing overall fuel usage by 40%. Moreover, because of its compact design, the burner can readily be incorporated into existing, nonregenerative systems, providing operating cost relief to businesses without requiring them to replace their entire furnace system.

Although the invention has been described with respect to a preferred embodiment, it will be appreciated that rearrangements and alterations of parts may be made without departing from the spirit and scope of the present invention, as defined in the appended claims.

Having described a specific preferred embodiment of the invention, the following is claimed:

1. A regenerative burner operable in fire and flue modes comprising:

a burner shell having first and second internal chambers, said first chamber being disposed on the flame axis of said burner and said second chamber surrounding the radial perimeter of said first chamber;

a gas permeable annular regenerative bed separating said first and second chambers such that gas flow between said first and second chambers must travel through said regenerative bed in a generally radial direction with respect to said flame axis;

means for supplying combustion air to said second chamber when said burner is in said fire mode and for exhausting products of combustion from said second chamber when said burner is in said flue mode; and means for supplying fuel in the vicinity of said flame axis for mixing with combustion air to support combustion when said burner is in said fire mode.

2. A regenerative burner as set forth in claim 1, wherein said fuel supplying means includes a generally tubular fuel guide assembly disposed coaxial with said flame axis, said assembly having a first axial end at which said fuel is dispensed for mixing with said combustion air, and wherein said regenerative bed is tapered toward said assembly in the axial direction opposite said first axial end.

3. A regenerative burner as set forth in claim 2 wherein said regenerative bed is conical.

4. A regenerative burner as set forth in claim 1, and further comprising eductor means including an exhaust outlet and eductor jet means, said outlet having an interior port coupled to said second chamber and an exterior port coupled to an exhaust area outside of said burner, and said eductor jet means blowing fluid into said interior port of said outlet, causing the pressure at said interior port to diminish, whereby products of combustion from said second chamber are sucked into said interior port, travel through said outlet, and are exhausted into said exhaust area.

5. A regenerative burner as set forth in claim 4, wherein said supplying and exhausting means includes means for closing said outlet when said burner is in the fire mode and opening said outlet when said burner is in the flue mode.

6. A regenerative burner as set forth in claim 1 and further comprising an annular eductor including an annular exhaust channel and eductor jet means, said annular channel having an annular interior port coaxial with, and opening into, said second chamber, and an exterior annular port coupled to an exhaust area outside of said burner, and said eductor jet means blowing air into said interior port when said burner is in said flue mode, causing gases from said second chamber to be sucked into said interior port, travel through said annular channel, and be exhausted into said exhaust area.

7. A regenerative burner as set forth in claim 6, wherein said eductor jet means comprises plural discrete eductor jets disposed at spaced angular locations around the axis of said annular eductor.

8. A regenerative burner as set forth in claim 6, and further comprising annular valve means coaxial with said annular interior port of said annular channel, said valve means being axially movable from a first position wherein said interior port is open, to a second position wherein said interior port is substantially blocked by said annular valve means.

9. A regenerative burner as set forth in claim 8, wherein said annular valve means comprises a unitary annular piston.

10. A regenerative burner as set forth in claim 9, wherein said annular piston has at least one air intake channel formed in it, one end of which opens into said second chamber and the other end of which may be coupled to a source of combustion air, said other end being blocked when said piston is in said first position and open when said piston is in said second position.

11. A regenerative burner as set forth in claim 1, and further comprising annular means defining an annulus for providing a path for flow of gaseous fluids between said second chamber and an area outside of said burner, and further wherein said supplying and exhausting means comprises annular valve means for coupling said annulus to an exhaust when said burner is in said flue mode and to an intake when said burner is in said fire mode.

12. A regenerative burner as set forth in claim 11, and further comprising means defining an exhaust channel having an interior opening adjacent said annulus and an exterior opening coupled to an exhaust area outside of said burner, wherein said annular valve means comprises an annular piston axially movable between a flue position wherein the flow path between said annulus and said interior exhaust channel opening is unobstructed, and a fire position wherein said flow path is blocked.

13. A regenerative burner as set forth in claim 12, wherein said annular piston has at least one air intake channel formed in it, one end of which opens into said second chamber and the other end of which is coupled to a source of combustion air, said burner further comprising means blocking said other end of said channel when said piston is in said flue position and not blocking said other end when said piston is in said fire position.

14. A regenerative burner as set forth in claim 13, wherein said blocking means comprises second piston means.

15. A regenerative burner as set forth in claim 14, wherein said second piston means is movable to a position wherein said other end of the first said annular piston is blocked even when said annular piston is in said fire position.

16. A regenerative burner as set forth in claim 1, wherein said fuel supplying means includes a generally tubular fuel guide assembly disposed coaxial with said flame axis, said assembly comprising means defining first and second internal, axially extending chambers for respectively receiving combustion air and gaseous fuel, and nozzle means for dispensing said gaseous fuel into a combustion chamber for burning, and wherein said nozzle means including static means for directing said gaseous fuel in different directions depending upon the relative pressures within said first and second axially extending chambers.

17. A regenerative burner as set forth in claim 16, wherein said nozzle means includes a central flame holding chamber, and wherein said fuel directing means directs said fuel into said flame holding chamber when the fuel pressure within said second chamber is relatively low, and out into said combustion chamber when fuel pressure within said second chamber is higher.

18. A regenerative burner as set forth in claim 17, wherein said fuel directing means comprises a nozzle having first and second intersecting passages formed in it, said first passage providing combustion air flow from said first internal chamber to said flame holding chamber, and said second passage providing gaseous fuel flow from said second internal chamber to said combustion chamber.

19. A regenerative burner as set forth in claim 18, wherein said nozzle is annular and plural said first and second passages are formed at spaced angular locations around said annular nozzle.

20. A regenerative burner as set forth in claim 16, wherein said second chamber substantially surrounds said first chamber whereby the flow of combustion air through said first chamber cools the flow of gaseous fuel through said second chamber.

21. A regenerative burner comprising:
a burner body incorporating a porous regenerative bed surrounding a burner and having passage means surrounding said regenerative bed for exhausting products of combustion (POC), and
eductor channel means coupled to said passage means, and eductor jet means for blowing air into the end of said eductor channel means nearest said passage means so as to draw POC from said passage means and expel them through said eductor channel means, said eductor channel means being formed by two closely spaced, generally parallel walls which are relatively long in a direction transverse to the direction of fluid flow such that the eductor channel means height can be selected inddpendently of eductor flow capacity.

22. A regenerative burner as set forth in claim 21, wherein said eductor channel means is formed by relatively closely spaced annular walls forming inner an outer annular port coupled to a flue means for discharging gases outside of said burner.

23. A regenerative burner as set forth in claim 22, wherein the radial spacing between said walls is different at different axial locations, said radial spacing diminishing as a function of increasing radius such that the cross sectional area of the flue gas flow path remains substantially constant over at least part of the axial extent of the passage means.

24. A regenerative burner as set forth in claim 22, wherein said passage means includes a burner baffle housing said regenerative bed, said burner baffle having a radially extending annular surface, and wherein said radially extending annular surface functions as a wall of said eductor channel means.

25. A regenerative burner as set forth in claim 22, and further comprising annular valve means coaxial with said passage means, said valve means being axially movable from a first position wherein said passage means is open, to a second position wherein said passage means is substantially blocked.

26. A regenerative burner as set forth in claim 25, wherein means is included defining an air intake plenum adapted to be coupled to a source of combustion air, and wherein said valve means couples air flow to said passage means from said plenum when in said second position, and blocks air flow to said passage means from said plenum when in said first position.

27. A regenerative burner as set forth in claim 26, and further comprising second annular valve means coaxial with the first annular valve means, said second annular valve means being movable from a third axial position to a fourth axial position, wherein said second annular valve means does not interfere with combustion air flow to said passage means from said plenum when it is in said third axial position and said first annular valve means is in said second position, and wherein said second annular valve means blocks combustion air flow to said passage means from said plenum when it is in said fourth axial position and said first annular valve means is in said second position.

28. A regenerative burner operable in flue and fire modes, comprising:
a generally cylindrical fuel guide assembly having a fuel dispensing end representing the axial front of said burner;
a regenerative bed disposed adjacent said fuel guide assembly;
a burner shell housing said fuel guide assembly and regenerative bed;
an annular wall coaxial with said fuel tube, said wall extending radially inward from said shell toward said fuel tube at an axial location behind said regenerative bed, said fuel guide assembly being radially spaced from said wall by an annulus through which flue gasses are exhausted when said burner is in said flue mode;
means defining an exhaust passage adjacent said annulus but on the axial side of said annulus opposite said regenerative bed, whereby flue gases must pass through said annulus to reach said exhaust passage; and,
annular piston means disposed coaxial with said fuel guide assembly, said annular piston means being movable between a first axial position wherein said piston does not interfere with flue gas exhaust flow through said annulus, and a second axial position wherein said piston means blocks the flue gas flow path between said annulus and said exhaust passage.

29. A regenerative burner as set forth in claim 28, wherein said means defining an exhaust passage comprises a second annular wall coaxial with said fuel tube, said second wall extending radially inward such that the axial spacing between the first wall and said second wall does not vary greatly at different radial locations, said exhaust passage being represented by the annular passage formed between said first and second walls.

30. A regenerative burner as set forth in claim 29, wherein said annular piston means comprises an annular piston having an outer diameter which is greater than the diameter of said annulus, and wherein said annular piston axially abuts said first wall when in said second axial position.

31. A regenerative burner as set forth in claim 29, and further comprising eductor jet means mounted on said piston means for blowing air into said annular passage when said piston means is in said first axial position.

32. A regenerative burner as set forth in claim 28, and further comprising means defining a combustion air chamber adapted to be coupled to a source of combustion air, wherein said annular piston means has at least one passage formed therein for providing a path for flow of combustion air from said combustion air chamber to said bed through said annulus when said piston means is in said second axial piston, and wherein means is provided for blocking said flow of combustion air through said at least one passage when said piston means is in said first axial position.

33. A regenerative burner as set forth in claim 32, wherein said at least one passage in said piston means comprises a plurality of axially extending passages formed at spaced angular locations around the perimeter of said piston means.

34. A regenerative burner as set forth in claim 32, wherein said blocking means comprises a second annular piston, said second annular piston being axially movable to an axial position wherein said flow of combustion air through said at least one passage is blocked even when the first said piston means is in said first axial position.

35. A regenerative burner as set forth in claim 28, wherein said regenerative bed is disposed around, and is coaxial with, said fuel guide assembly.

36. A regenerative burner as set forth in claim 35, wherein said regenerative bed is radially separated from said fuel guide assembly by a first annular gap, and from said shell by a second annular gap, and wherein air flow through said buner passes generally radially between said first and second gaps through said regenerative bed.

37. A regenerative burner as set forth in claim 36, wherein said regenerative bed is generally conical.

38. A regenerative burner having flue and fire modes of operation, including:
means defining a fluid flow path through which combustion air flows when said burner is in said fire mode and products of combustion flow when said burner is in said flue mode, and
a regenerative bed disposed across said fluid flow path such that fluid flow along said path must pass through said bed, wherein said bed is composed of a material presenting a high heat transfer surface area per unit volume, and said bed has a thickness in the direction of fluid flow which is less than the square root of the cross sectional flow area, whereby said bed transfers substantially all of the heat from said products of combustion to said air as said burner alternates between said flue and fire modes of operation, yet the pressure drop across said bed is relatively small, wherein said flow path extends radially with respect to an axis and wherein said bed extends circumferentially around said axis.

39. A burner having a flame axis, comprising:
means for supplying low velocity combustion air along said flame axis; and
a generally tubular fuel guide assembly disposed coaxial with said flame axis, said assembly comprising means defining first and second internal, axially extending chambers for respectively receiving combustion air and gaseous fuel, and nozzle means for dispensing said gaseous fuel into said low velocity combustion air for burning, said nozzle means including means defining a central flame holding chamber and static means for directing said gaseous fuel in different directions depending upon the relative pressures within said first and second axially extending chambers, said fuel directing means directing said fuel into said flame holding chamber when the fuel pressure within said second chamber is relatively low, and out into said low velocity combustion air when fuel pressure within said second chamber is higher.

40. A regenerative burner as set forth in claim 39, wherein said fuel directing means comprises a nozzle having first and second intersecting passages formed in it, said first passage providing combustion air flow from said first internal chamber to said flame holding chamber, and said second passage providing gaseous fuel flow from said second internal chamber to said low velocity combustion air.

41. A regenerative burner as set forth in claim 40, wherein said nozzle is annular and plural said first and second passages are formed at spaced angular locations around said annular nozzle.

42. A regenerative burner as set forth in claim 39, wherein said second chamber substantially surrounds said first chamber whereby the flow of combustion air through said first chamber cools the flow of gaseous fuel through said second chamber.

* * * * *